United States Patent [19]

Shiroyama et al.

[11] Patent Number: 4,506,868
[45] Date of Patent: Mar. 26, 1985

[54] SHOCK ABSORBER FOR VEHICULAR COUPLERS

[75] Inventors: Shoichi Shiroyama, Osaka; Kazuo Yamashita, Komaki; Katsuji Morishita, Kasugai, all of Japan

[73] Assignees: Sumitomo Metal Industries, Ltd., Osaka; Tokai Rubber Industries, Ltd., Komaki, both of Japan

[21] Appl. No.: 498,884

[22] Filed: May 27, 1983

[51] Int. Cl.³ .................. F16F 9/30; B61G 9/06; B60G 11/22
[52] U.S. Cl. ..................... 267/3; 188/268; 213/45; 213/47; 267/63 R
[58] Field of Search ............ 267/140.4, 141.1, 141.3, 267/153, 63 R, 3; 188/112 A, 112 R, 378, 379, 268, 124, 125; 213/40 R, 44, 45, 47, 50, 54, 55, 56

[56] References Cited

U.S. PATENT DOCUMENTS

| | | | |
|---|---|---|---|
| 2,640,602 | 6/1953 | Willison | 213/46 R |
| 2,640,603 | 6/1953 | Willison | 213/45 |
| 2,686,602 | 8/1954 | Willison | 213/45 |
| 2,686,667 | 8/1954 | Willison et al. | 267/63 R X |
| 3,185,317 | 5/1965 | Willison | 213/45 |
| 3,414,135 | 12/1968 | Levie | 213/45 |
| 3,637,088 | 1/1972 | Bremond | 213/45 |
| 4,085,832 | 4/1978 | Gaines et al. | 267/63 R X |
| 4,198,037 | 4/1980 | Anderson | 267/63 R X |

FOREIGN PATENT DOCUMENTS

| | | |
|---|---|---|
| 0941913 | 4/1956 | Fed. Rep. of Germany ........ 213/45 |
| 54-138213 | 4/1978 | Japan . |
| 138214 | 10/1979 | Japan . |
| 58-97556 | 6/1983 | Japan . |

Primary Examiner—Bruce H. Stoner, Jr.
Assistant Examiner—Robert J. Oberleitner
Attorney, Agent, or Firm—Anthony J. Casella; Gerald E. Hespos

[57] ABSTRACT

Herein disclosed is a shock absorber which is to be used with a vehicular coupler. The shock absorber includes a shock absorbing frame which has a pair of shoulders. Further inclusive are a pair of follower plates which are adapted to be held to abut against the shoulders of the shock absorbing frame. A main elastic member is clamped under compression between the paired follower plates. A pair of auxiliary elastic members are also clamped under compression, respectively, between the shock absorbing frame and those faces of the follower plates, which are opposite to the faces contacting with the main elastic member. The initial pressure applied to the main elastic member is balanced by the initial pressures to the auxiliary elastic members. Thus, the paired follower plates can take their neutral positions without being forced onto the shoulders of the shock absorbing frame.

5 Claims, 4 Drawing Figures

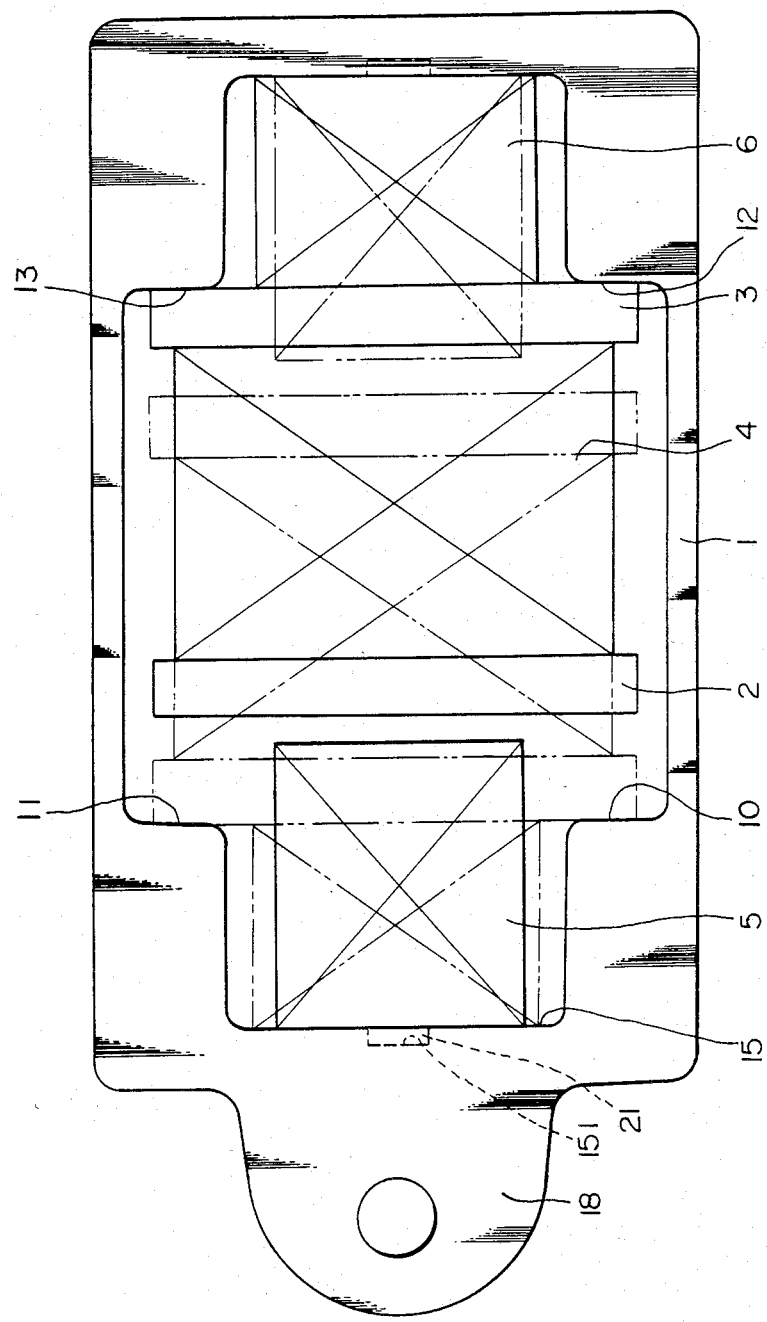

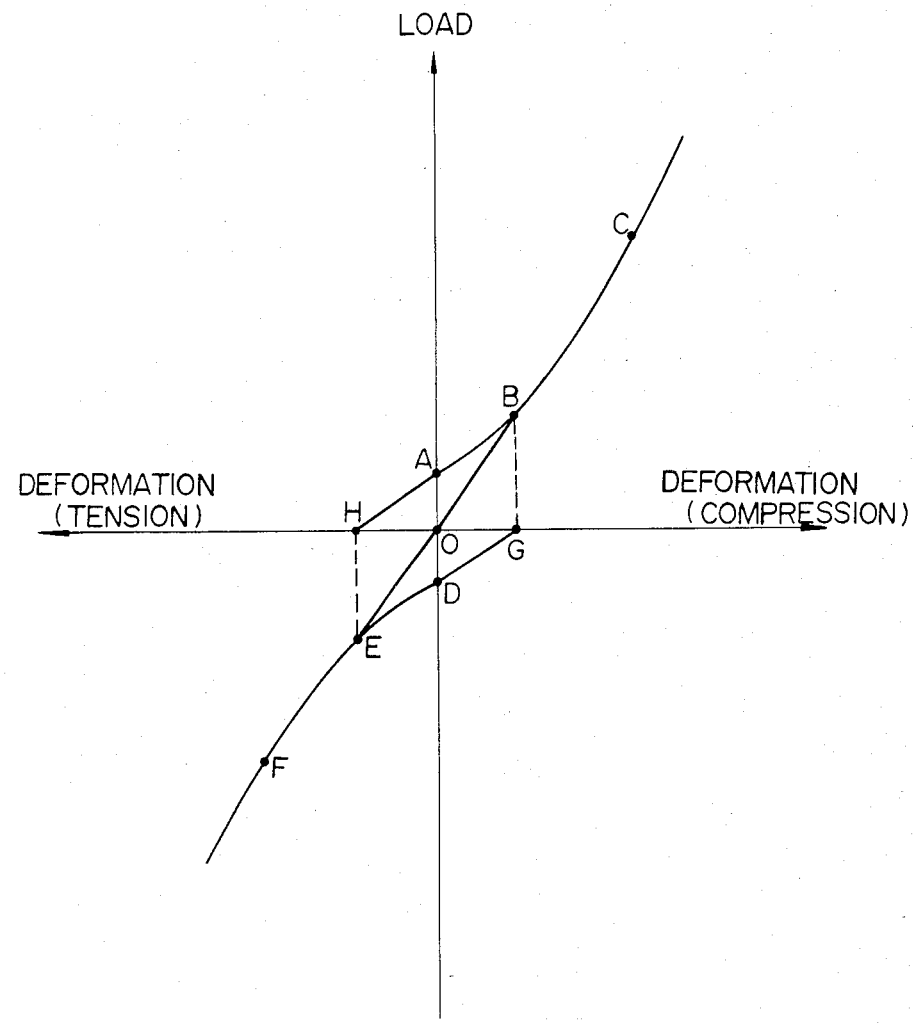

SHOCK ABSORBER FOR VEHICULAR COUPLERS

BACKGROUND OF THE INVENTION

1. Field of the Invention

The present invention generally relates to a vehicular coupler and, more particularly, to a shock absorber for use with a coupler for coupling vehicles such as trains.

2. Description of the Prior Art

In the prior art, rubber shock absorbers have been used for vehicular couplers because they are small and light, but enjoy a large shock absorbing capacity, a low cost and excellent maintainability. Since rubber has non-linear recessed load-deformation characteristics, it has a small shock absorbing capacity within a low-load range, in which shocks applied are weak, so that it can enjoy a high cushioning effect. When the shocks become strong, on the contrary, the rubber has such characteristics that it has a low cushioning effect but can enjoy a large shock absorbing capacity.

The rubber shock absorber is initially pressurized to some extent to compensate for its so-called "yield" due to aging of the rubber after a long use. As a result, the shock absorber exhibits a predetermined performance if it is subjected to a pressure equal to or stronger than the initial one, but not if the pressure applied is weaker than the initial one.

To solve this problem, it has been stated in JA-OS Nos. 54-138213 and 54-138214, laid open for public inspection on Oct. 26, 1979, to use a shock absorber in which two elastic members of rubber are used to interpose an H-shaped shock absorbing frame inbetween so that they may offset their initial pressures. The shock absorber disclosed in the above cited references is intended to enjoy a shock absorbing effect even for a low load of weak shocks. However, this prior art shock absorber raises new problems in that it requires two sets of main elastic members, whereas other prior art shock absorbers are equipped with only one. As a result, consideration has to be taken into the tensile direction of elasticity, whereas only the elasticity in the direction of compression had been considered in other prior art shock absorbers. Hence a compression range of the elastic member twice as high as that of the prior art is required to construct the elastic member, typically by overlaying rubber pads having complicated shapes. Also there is a fear of the aging of the rubber elastic member.

SUMMARY OF THE INVENTION

It is, therefore, an object of the present invention to provide a shock absorber for use with a vehicular coupler, which is freed from the above-identified problems by using a main elastic member and a pair of auxiliary elastic members.

Another object of the present invention is to provide a shock absorber of the above type, in which there is no band incapable of absorbing shocks, so that it can follow any weak shocks.

According to a main feature of the present invention, there is provided a shock absorber for use with a vehicular coupler, comprising: a shock absorbing frame having a pair of shoulders; a pair of follower plates adapted to be held to abut against the shoulders of said shock absorbing frame; a main elastic member clamped under compression between said paired follower plates; and a pair of auxiliary elastic members clamped under compression, respectively between said shock absorbing frame and those faces of said follower plates, which are opposite to the faces contacting with said main elastic member.

In the shock absorber of the present invention, the initial pressure applied to the main elastic member is balanced by the initial pressures to the auxiliary elastic members. As a result, the paired follower plates can take their neutral positions without being forced onto the shoulders of the shock absorbing frame.

BRIEF DESCRIPTION OF THE DRAWINGS

Other objects, features and advantages of the present invention will become apparent from the following description taken in conjunction with the accompanying drawings, in which:

FIG. 3 is similar to FIG. 2 but shows the shock absorber when a load is applied to the shock absorber; and FIG. 4 is a diagram illustrating the load-deformation characteristics curves of the shock absorber of the present invention, the main elastic member and the auxiliary elastic members.

DESCRIPTION OF THE PREFERRED EMBODIMENT

The preferred embodiment of the present invention will be described in detail in the following with reference to the accompanying drawings.

Figure 1:
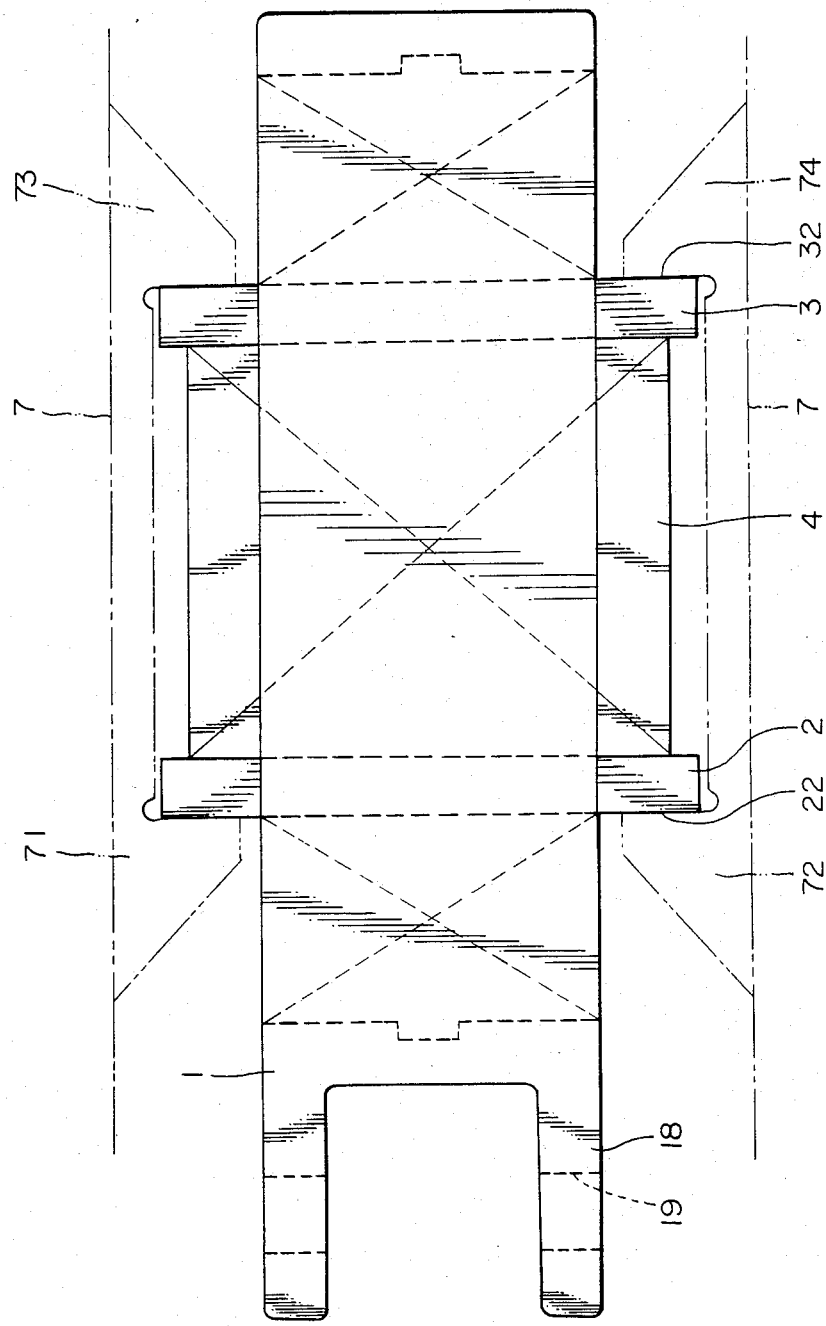
FIG. 1 is a top plan view showing a shock absorber embodying the present invention.
Figure 2:
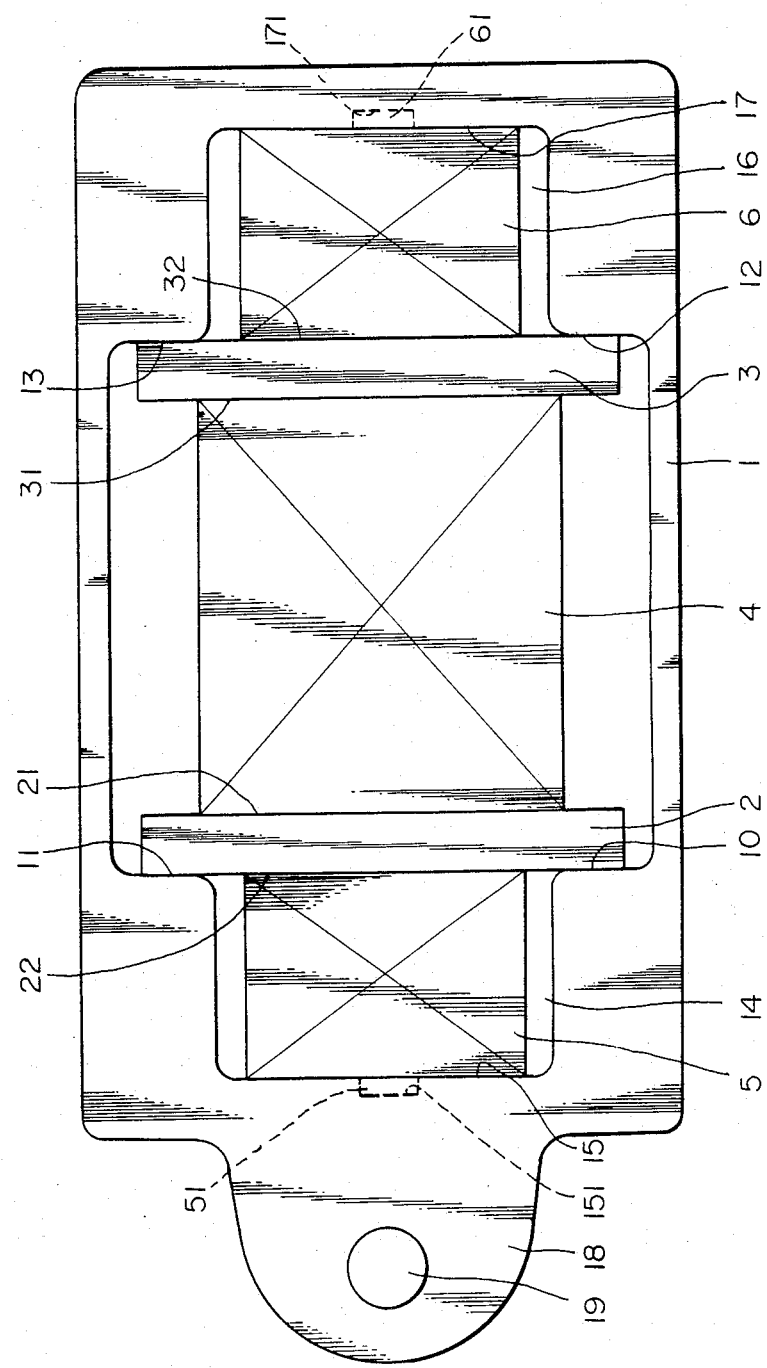
FIG. 2 is a side elevation showing the shock absorber of FIG. 1.

The shock absorber for a vehicular coupler according to the present invention is shown in its top plan view in FIG. 1 and in its side elevation in FIG. 2. This shock absorber is constructed to include: a shock absorbing frame 1 which is formed with shoulders 10 and 11, and 12 and 13 facing each other; a first follower plate 2 abutting against the shoulders 10 and 11; a second follower plate 3 abutting against the shoulders 12 and 13; a main elastic member 4 which is clamped under compression between the surface 21 of the first follower plate 2 and the surface 31 of the second follower plate 3; a first auxiliary elastic member 5 which is clamped under compression between the bottom 15 of a first recess 14 formed between the shoulders 10 and 11 and the back 22 of the first follower plate 2 such that its land 51 is fixedly fitted in a groove 151 formed in the bottom 15 of the first recess 14; and a second auxiliary elastic member 6 which is clamped under compression between the bottom 17 of a second recess 16 formed between the shoulders 12 and 13 and the back 32 of the second follower plate 3 such that its land 61 is fixedly fitted in a groove 171 formed in the bottom 17 of the second recess 16. The main elastic member is constructed by overlaying a plurality of plate-shaped rubber pads. On the other hand, the auxiliary elastic members 5 and 6 are made of block-shaped rubber. The main elastic member 4 should not be limited to the laminated rubber pads but can use an elastic member of the prior art. On the other hand, the auxiliary elastic members 5 and 6 are desired to be made of block-shaped rubber. Nevertheless, the auxiliary elastic members 5 and 6 should not necessarily be limited to rubber but may be constructed of coil springs or dished disc springs.

The shock absorbing frame 1 is different from the old shock absorbing frame of the prior art in that it is formed with the first and second recesses 14 and 16. Moreover, the shock absorbing frame 1 should not be limited to that shown in FIG. 1, but may be of another configuration formed with backs for holding the follower plates 2 and 3 and with spaces for clamping the auxiliary elastic members 5 and 6 on the backs of the follower plates 2 and 3. Additionally, the auxiliary elastic members 5 and 6 may be either fixed on the shock absorbing frame 1, or on the backs of the follower plates 2 and 3. Unless the auxiliary elastic members 5 and 6 come out or change their positions during their operations, moreover, they need not necessarily be fixed on the shock absorbing frame 1 or the follower plates 2 and 3. The initial pressures to and the load-deformation characteristics of the main elastic member 1 and the auxiliary elastic members 2 and 3 will be described in detail hereinafter.

As shown in FIG. 1, the shock absorber thus constructed is held on a vehicular body 7 such that the respective backs 22 and 32 of its first and second follower plates 2 and 3 abut against follower plate holders 71, 72, 73 and 74 of the vehicular body 7. Moreover, a vehicular coupler (although not shown) is coupled by means of a pin hole 19 and a pin (although not shown) to a coupling portion 18 which is formed at one end of the shock absorbing frame 1. When shocks of tension or compression occur between two cars to which the shock absorber of the present invention is attached, still moreover, the follower plate holders 71 to 74 of the vehicular body 7 and the shock absorbing frame 1 move relative to each other (i.e., toward or apart from each other or to the right or left, as viewed in FIG. 1) so that the shocks can be absorbed.

When the shock absorbing frame 1 is pulled to the left, as viewed in FIG. 1, relative to the vehicular body 7, the shock absorber takes such a position as is shown by solid lines in FIG. 3. Even if the shock absorbing frame 1 is pulled to the left of FIG. 1, more specifically, the first follower plate 2 comes into abutment against the follower plate holders 71 and 72 of the vehicular body 7 so that it cannot move any more. As a result, the shock absorbing frame 1, the second follower plate 3 and the second auxiliary elastic member 6 move to the left in a state leaving the first follower plate 2 at its initial position. Moreover, the main elastic member 4 is strongly compressed between the first and second follower plates 2 and 3 so that it is further compressed. Meanwhile, the first auxiliary elastic member 5 is released to restore its initial state from its compressed state as a result that the spacing between the first follower plate 2 and the bottom 15 of the shock absorbing frame 1 is increased. In this particular state, the first auxiliary elastic member 5 is not clamped by the first follower plate 2 but is held on the bottom 15 by the coupling between the groove 151 of the bottom 15 of the shock absorbing frame 1 and the land 51 of the first auxiliary elastic member 5.

On the contrary, when the shock absorbing frame 1 is pushed to the right, as viewed in FIG. 1, relative to the vehicular body 7, the shock absorber takes such a position that its respective components are arranged, as shown by double-dotted lines in FIG. 3. Specifically, the first follower plate 2 is pushed onto the shoulders 10 and 11, so that the first auxiliary elastic member 5 is returned to its initial state; and the second follower plate 3 leaves the shoulders 12 and 13 so that the second auxiliary elastic member 6 is released from the compression and is allowed to elongate. Even in this case, however, the main elastic member 4 is strongly compressed likewise the pulling operation.

These movements of the shock absorbing frame 1 relative to the vehicular body 7 are illustrated in the load-deformation diagram of FIG. 4. In FIG. 4, an abscissa indicates the displacement (or deformation) of the shock absorbing frame 1 relative to the vehicular body 7. And, the relative positions of the vehicular body 7 and the shock absorbing frame 1 approach to the right of FIG. 4 but leave apart from each other to the left of FIG. 4. The load is a compressive one to be applied between the main elastic member 4 and the two auxiliary elastic members 5 and 6. Incidentally, the load is inversely indicated at the tensile side because it takes the opposite symbols at the tensile and compressive sides.

In FIG. 4, a characteristic curve A-B-C and a characteristic curve D-E-F plot the load-deformation characteristics of the main elastic member 4. The load at the point A is one by which the main elastic member 4 presses the second follower plate 3 in the state of FIG. 2, whereas the load at the point D is one by which the main elastic member 4 presses the first follower plate 2 in the state of FIG. 2. Moreover, the loads at the points A and D are opposite in direction but are in a relationship of a stress and an anti-stress so that they are equal. Still moreover, the loads thus defined are the initial pressure to be applied to the main elastic member 4.

On the other hand, the load and deformation at the point C are those between the vehicular body 7 and the shock absorbing frame 1 in the case of the state indicated by the double-dotted lines of FIG. 3, whereas the load and deformation at the point F are those between the vehicular body 7 and the shock absorbing frame 1 in the case of state indicated by the solid lines of FIG. 3.

A curve D-G plots the load-deformation characteristics of the second auxiliary elastic member 6 whereas a curve A-H plots the load-deformation characteristics of the first auxiliary elastic member 5. The loads at the points A and D are initial pressures to be applied to first and second auxiliary elastic members 5 and 6. On the other hand, the load indicated by a curve O-B is the sum of the loads, which are applied from the main elastic member 4 and the second auxiliary elastic member 6 to the second follower plate 3, namely, the sum of the loads indicated by the curves A-B and D-G. The load indicated by the curve O-B is one to be applied between the vehicular body 7 and the shock absorbing frame 1. Likewise, the load indicated by the curve O-E is the sum of the loads, which are applied from the main elastic member 4 and the first auxiliary elastic member 5 to the first follower plate 2, namely, the sum of the loads indicated by the curves D-E and A-H. The load indicated by the curve O-E is one to be applied between the vehicular body 7 and the shock absorbing frame 1.

In short, according to the shock absorber of the present invention, the load-deformation characteristics between the vehicular body 7 and the shock absorbing frame 1 are expressed by the curve C-B-O-E-F. As a result, the shock absorber can establish deformation to absorb the shocks applied, even in case a weaker force than the initial pressure of the main elastic member 4 is applied. Moreover, the stress smoothly acts because the curve C-B-O-E-F is smooth. Thus, the vehicle or car using the shock absorber of the present invention is little shocked and smoothly accelerated so that it can provide excellent riding comfort.

What is claimed is:

1. A shock absorber for use with a coupler on a vehicle, comprising:
    a shock absorbing frame having first and second opposed bottom walls formed therein and first and second pairs of opposed shoulders formed in said frame intermediate said bottom walls;
    first and second follower plates movably mounted in said frame intermediate said first and second pairs of opposed shoulders, with said first follower plate being disposed against the first pair of shoulders of said shock absorbing frame and the second said follower plate being disposed against the second pair of shoulders thereof, said first follower plate being disposed to be contacted by a first part of the vehicle and urged toward the second pair of shoulders, said second follower plate being disposed to be contacted by a second part of the vehicle and urged toward the first pair of shoulders;
    a main elastic member clamped under compression between said paired follower plates; and
    first and second auxiliary elastic members, said first auxiliary elastic member being clamped under compression between the first bottom wall of said shock absorbing frame and said first follower plate and the second auxiliary elastic member being clamped under compression between said second bottom wall and said second follower plate, the compression of said first and second auxiliary elastic members substantially balancing the compression of the main elastic member, such that the first and second follower plates are disposed adjacent to but not forced against the first and second pairs of shoulders respectively.

2. A shock absorber as set forth in claim 1, wherein said auxiliary elastic members are fixed on said shock absorbing frame such that they can abut against said follower plates.

3. A shock absorber as set forth in claim 1, wherein said auxiliary elastic members are fixed on the backs of said follower plates such that they can abut against said shock absorbing frame.

4. A shock absorber as set forth in claim 1, wherein said auxiliary elastic members include shock absorbing elements.

5. A shock absorber as set forth in claim 4, wherein said shock absorbing elements are made of block-shaped ruber.

* * * * *